United States Patent
Merrill (10) Patent No.: US 10,208,974 B2
(45) Date of Patent: Feb. 19, 2019

(54) METHODS AND SYSTEM FOR OBTAINING AND USING WIND CONDITION DATA

(71) Applicant: SCHNEIDER ELECTRIC BUILDINGS, LLC, Palatine, IL (US)

(72) Inventor: Paul Winslow Merrill, Sandhurst (GB)

(73) Assignee: SCHNEIDER ELECTRIC BUILDINGS, LLC, Palatine, IL (US)

( * ) Notice: Subject to any disclaimer, the term of this patent is extended or adjusted under 35 U.S.C. 154(b) by 241 days.

(21) Appl. No.: 15/211,264

(22) Filed: Jul. 15, 2016

(65) Prior Publication Data

US 2018/0017275 A1 Jan. 18, 2018

(51) Int. Cl.
| | |
|---|---|
| *G05D 23/19* | (2006.01) |
| *F24F 11/30* | (2018.01) |
| *F24F 11/62* | (2018.01) |
| *G05B 15/02* | (2006.01) |
| *F24F 110/12* | (2018.01) |
| *F24F 11/63* | (2018.01) |
| *F24F 110/32* | (2018.01) |
| *F24F 110/70* | (2018.01) |
| *F24F 120/10* | (2018.01) |

(Continued)

(52) U.S. Cl.
CPC .......... *F24F 11/30* (2018.01); *F24F 11/62* (2018.01); *G05B 15/02* (2013.01); *F24F 11/63* (2018.01); *F24F 2110/10* (2018.01); *F24F 2110/12* (2018.01); *F24F 2110/32* (2018.01); *F24F 2110/50* (2018.01); *F24F 2110/70* (2018.01); *F24F 2120/10* (2018.01); *F24F 2120/14* (2018.01); *G05B 2219/2642* (2013.01)

(58) Field of Classification Search
CPC .... F24F 11/30; F24F 2110/50; F24F 2110/70; F24F 11/74; F24F 3/044; G01N 1/2273; G01N 33/0067; Y02B 30/767; Y02B 30/78; G05B 13/041; G05B 2219/2642
See application file for complete search history.

(56) References Cited

U.S. PATENT DOCUMENTS

| | | |
|---|---|---|
| 4,215,408 A | 7/1980 | Games et al. |
| 6,439,469 B1 | 8/2002 | Gruber et al. |

(Continued)

OTHER PUBLICATIONS

Cynthia Howard-Reed et al., Effect of ventilation systems and air filters on decay rates of particles produced by indoor sources in an occupied townhouse, Atmospheric Environment 37 (2003) 5295-5306. (Year: 2003).*

(Continued)

*Primary Examiner* — Darrin D Dunn
(74) *Attorney, Agent, or Firm* — Lando & Anastasi, LLP (57) ABSTRACT

According to various aspects and embodiments, a system and method for controlling temperature in a control zone within a building is provided. According to some embodiments, the method includes receiving measured wind condition data external to the building and measured tracer gas concentration data in the control zone for a sample time interval and calculating an air flow characteristic for the sample time interval based on the measured tracer gas concentration data. The method further includes using the air flow characteristic in a temperature control loop for the control zone. According to some embodiments, the air flow characteristic is an air change rate (ACR) that may be used in determining a preheat time interval.

16 Claims, 6 Drawing Sheets

(51) Int. Cl.
   *F24F 110/50* (2018.01)
   *F24F 110/10* (2018.01)
   *F24F 120/14* (2018.01)

(56) References Cited

U.S. PATENT DOCUMENTS

| | | | | |
|---|---|---|---|---|
| 2005/0145191 | A1* | 7/2005 | Cohen | A01K 1/031 119/455 |
| 2006/0234621 | A1* | 10/2006 | Desrochers | F24F 3/044 454/239 |
| 2007/0216682 | A1* | 9/2007 | Navratil | G06T 11/20 345/440 |
| 2007/0225951 | A1* | 9/2007 | Eryilmaz | G05B 17/02 703/2 |
| 2008/0092633 | A1* | 4/2008 | Wagner | G01M 3/226 73/40.7 |
| 2009/0037109 | A1* | 2/2009 | Romero | G01V 3/32 702/7 |
| 2013/0030575 | A1* | 1/2013 | Dempsey | F24F 11/04 700/276 |
| 2013/0180700 | A1* | 7/2013 | Aycock | F24F 11/0001 165/248 |
| 2013/0260668 | A1* | 10/2013 | Stakutis | F24F 11/0001 454/256 |
| 2013/0268208 | A1* | 10/2013 | Burba | G01P 5/001 702/24 |
| 2014/0236521 | A1* | 8/2014 | Wong | G01F 25/0007 702/100 |
| 2014/0303789 | A1* | 10/2014 | Wroblewski | F24F 11/30 700/276 |
| 2015/0006471 | A1* | 1/2015 | Przestrzelski | G04F 13/00 707/603 |
| 2017/0356666 | A1* | 12/2017 | Adkerson | F24F 11/0001 |

OTHER PUBLICATIONS

Wallace et al., Continuous measurements of air change rates in an occupied house for 1 year: The effect of temperature, wind, fans, and windows, Journal of Exposure Analysis and Environmental Epidemiology (2002) 12, 296-306 (Year: 2002).*

Gruber, Peter et al., "Predictive Control for Heating Applications," Clima 2000/Napoli 2001 World Congress—Napoli, Sep. 15-18, 2001, version 1.3.01, pp. 1-15.

Laussman, Detlef et al., "Air Change Measurements Using Tracer Gases," 2011, In Dr. Nicolas Mazzeo (Ed.) Chemistry, Emission Control, Radioactive Pollution and Indoor Air Quality (pp. 365-406). InTech, DOI: 10.5772/18600.

Levermore, G.J., "Building Services Engineering Research and Technology," Building Serv Eng Res Technol 1988 9: 109; DOI: 10.1177/014362448800900304, pp. 109-116.

Persily, Andrew K, Ph.D., "Evaluating Building IAQ and Ventilation with Indoor Carbon Dioxide," ASHRAE Transactions, vol. 103, No. 2, 1997, pp. 1-12.

Simmons, C. et al., "Using Carbon Dioxide as a Tracer Gas to Measure Air Change Rate in a Single Zone," Boelter & Yates, Inc. 2004, pp. 26.

* cited by examiner

Receive wind condition data for sample time interval
402

Receive measured tracer gas concentration data for sample time interval
404

Calculate reference ACR
406

Correlate wind condition data from sample time interval with reference ACR
408

Receive wind condition data for operating time interval
410

Determine operating ACR
412

Use operating ACR in temperature control loop
414

METHODS AND SYSTEM FOR OBTAINING AND USING WIND CONDITION DATA

BACKGROUND

Technical Field

The technical field of this disclosure relates generally to building control systems for heating, ventilation, and air conditioning systems, and more specifically, to systems and methods for obtaining an air flow characteristic that may be used by a control system.

Background Discussion

HVAC systems are often used to regulate environmental conditions, such as air temperature and humidity, in one or more control zones within a building or other structure. Such HVAC systems typically include a controller that controls various components of the HVAC system in order to affect the temperature or humidity of the air within the building. Controllers for HVAC systems may be configured to conserve energy by adjusting the setpoint temperature of a control zone during periods of non-occupancy. For instance, during the winter months, heating may be disabled during periods of non-occupancy and the space temperature is allowed to drop. Conversely, during the summer months, cooling may be disabled during periods of non-occupancy, and the space temperature is allowed to increase. When heating or cooling is disabled, the space temperature may therefore be allowed to reach a natural level as determined by outside conditions and/or any sources of energy located within the building.

Figure 1:
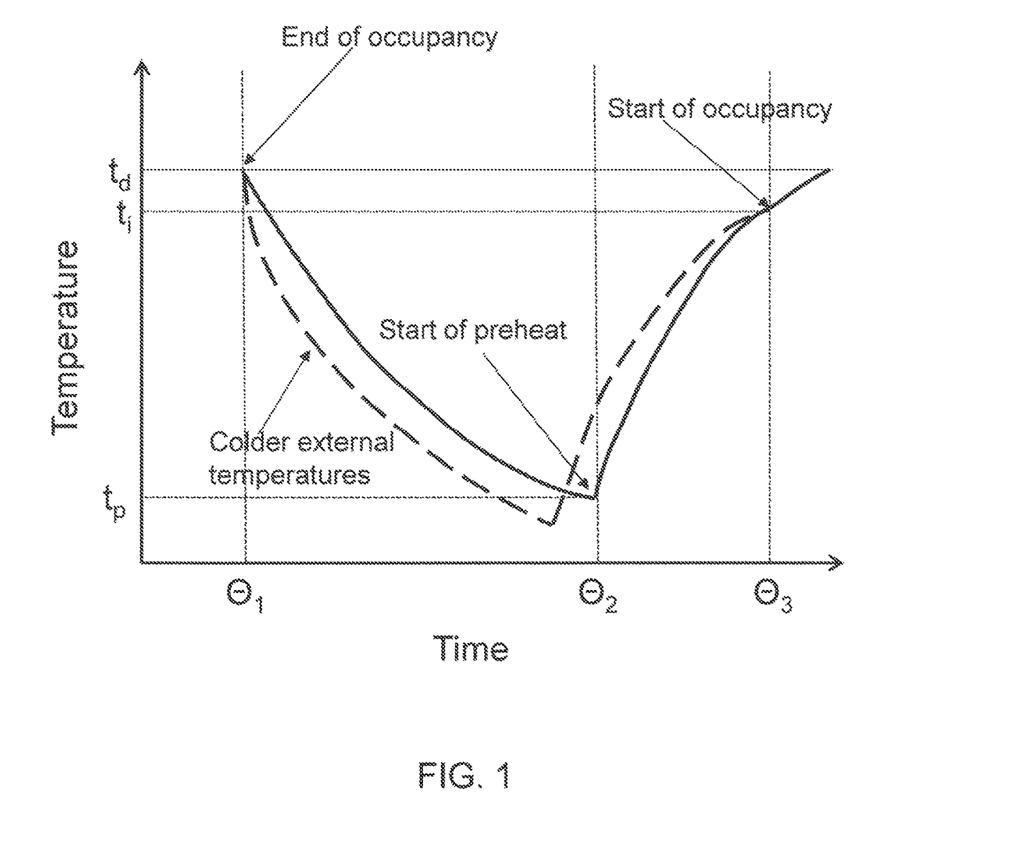
FIG. 1 is a graph showing temperature values in a controlled space for a period of time that spans a period of non-occupancy.

In order for the control zone to achieve a desired temperature at the start of a period of occupancy (referred to herein as the target start of occupancy temperature $t_i$) HVAC controllers may include an algorithm for determining at what time prior to occupancy one or more components of the HVAC system must be activated. This time period is often referred to as the preheat period (also referred to herein as the preheat time interval), although the term also applies in instances where the air is cooled, rather than heated. To illustrate, FIG. 1 is a graph showing temperature values in a controlled space (otherwise referred to herein as a control zone) during a period of non-occupancy. At time $\Theta_1$, the period of occupancy ends with the temperature in the controlled space being at the desired setpoint temperature $t_d$, and the period of non-occupancy begins. The temperature drops to $t_p$ until time $\Theta_2$, when the HVAC system is turned on to raise the temperature to $t_i$ by the time of occupancy re-commences at $\Theta_3$. The period between $\Theta_2$ and $\Theta_3$ is known as the preheat period, and is sometimes also referred to as the "boost" or "start-up" period. Time $\Theta_2$ therefore denotes the start of the preheat period and $\Theta_3$ denotes the end of the preheat period. According to the example shown in FIG. 1, the temperature may continue to rise from the start of occupancy temperature $t_i$ to the setpoint temperature $t_d$ after the time of occupancy re-commences at $\Theta_3$. In certain instances, the target temperature at the start of occupancy $t_i$ may be lower than the target setpoint temperature $t_d$ because occupants may accept a lower temperature than the target setpoint temperature at the beginning of the occupancy period as compared to later on in the occupancy period. For example, occupants entering the controlled space from cold outside temperatures may accept a lower indoor temperature initially out of thankfulness for being out of the cold. Similar logic also applies to cooling, where the target temperature at the start of occupancy $t_i$ may be higher than the setpoint temperature $t_d$.

Miscalculation of the preheat period can have negative consequences. For instance, if the preheat period is too short, the start of occupancy temperature is not achieved, and if the preheat period is too long, the start of occupancy temperature is achieved prematurely with unnecessary use of energy.

SUMMARY

According to one aspect of the present invention, a method of controlling temperature in a control zone within a building is provided comprising receiving measured wind condition data external to the building for at least one sample time interval, receiving measured tracer gas concentration data in the control zone for the at least one sample time interval, calculating an air flow characteristic for the at least one sample time interval based on the measured tracer gas concentration data, and using the air flow characteristic in a temperature control loop for the control zone.

According to one embodiment, calculating the air flow characteristic comprises calculating a reference air flow characteristic, and the method further comprises generating correlated data by correlating the measured wind condition data to the reference air flow characteristic.

According to one embodiment, generating correlated data comprises generating a data structure that indexes the measured wind condition data with the reference air flow characteristic for the sample time interval. According to another embodiment, generating correlated data comprises generating a trendline that correlates the measured wind condition data with the reference air flow characteristic for the sample time interval.

According to one embodiment, the method further comprises receiving measured wind condition data external to the building for an operating time interval, determining an operating air flow characteristic based on the measured wind condition data for the operating time interval and the correlated data, and using the operating air flow characteristic in the temperature control loop for the control zone. According to another embodiment, determining the operating air flow characteristic comprises comparing the measured wind condition data for the operating time interval and the measured wind condition data for the sample time interval.

According to one embodiment, the method further comprises calculating a preheat time interval for the temperature control loop based at least in part on the operating air flow characteristic. According to one embodiment, the preheat time interval is calculated using an empirical method. According to another embodiment, the preheat time interval is calculated using a model based function.

According to one embodiment, the operating time interval includes at least a portion of the preheat time interval. According to another embodiment, the operating time interval immediately precedes the preheat time interval.

According to at least one embodiment, the measured wind condition data is at least one of wind speed data and wind direction data.

According to at least one embodiment, the air flow characteristic is air change rate (ACR).

According to some embodiments, the measured wind condition data is averaged for the at least one sample time interval. According to some embodiments, the at least one sample time interval comprises multiple sample time intervals, and the air flow characteristic is averaged over the multiple sample time intervals.

According to one embodiment, at least one sample time interval occurs when the control zone is unoccupied. According to one embodiment, the at least one sample time interval begins when the control zone is unoccupied after an interval of time when the control zone is occupied. According to one embodiment, the tracer gas is carbon dioxide generated by one or more human occupants of the control zone during the interval of time when the control zone is occupied.

According to another aspect of the present invention, a system for controlling temperature in a control zone within a building comprises at least one wind sensor positioned external to the building, the at least one wind sensor configured to measure at least one wind condition, at least one concentration sensor positioned within the control zone, the at least one concentration sensor configured to measure tracer gas concentration, at least one temperature sensor positioned within the control zone, the at least one temperature sensor configured to measure temperature, and a controller configured to: receive data corresponding to measured wind conditions from the at least one wind sensor for at least one sample time interval, receive data corresponding to the measured tracer gas concentration from the at least one concentration sensor for the at least one sample time interval, calculate an air flow characteristic for the at least one sample time interval based on the data corresponding to the measured tracer gas concentration data, and execute a temperature control loop for the control zone using the air flow characteristic.

According to one embodiment, calculating the air flow characteristic comprises calculating a reference air flow characteristic, and the controller is further configured to generate correlated data by correlating the data corresponding to the measured wind conditions to the reference air flow characteristic. According to another embodiment, the controller is further configured to generate a data structure that indexes the measured wind condition data with the reference air flow characteristic for the sample time interval. According to yet another embodiment, the system further comprises a memory in communication with the controller that is configured to store the data structure.

According to one embodiment, the controller is further configured to generate a trendline that correlates the measured wind condition data with the reference air flow characteristic for the sample time interval.

According to one embodiment, the controller is further configured to: receive data corresponding to measured wind conditions from the at least one wind sensor for an operating time interval, determine an operating air flow characteristic based on the data corresponding to the measured wind condition data for the operating time interval and the correlated data, and execute the temperature control loop for the control zone using the operating air flow characteristic. According to another embodiment, the controller is further configured to compare the measured wind condition data for the operating time interval and the measured wind condition data for the sample time interval. According to another embodiment, the controller is further configured to calculate a preheat time interval for the temperature control loop based at least in part on the operating air flow characteristic.

According to at least one embodiment, the at least one sample time interval occurs when the control zone is unoccupied. According to another embodiment, the at least one sample time interval begins when the control zone is unoccupied after an interval of time where the control zone is occupied.

According to one embodiment, the system further comprises an HVAC system associated with the control zone, and executing a temperature control loop comprises transmitting a control signal to at least one component of the HVAC system.

According to one embodiment, the at least one wind sensor is positioned adjacent to the building. According to another embodiment, the controller is configured to receive the wind condition data from a web site.

According to one embodiment, the controller is further configured to update the air flow characteristic using recursive averaging.

Still other aspects, embodiments, and advantages of these example aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Embodiments disclosed herein may be combined with other embodiments, and references to "an embodiment," "an example," "some embodiments," "some examples," "an alternate embodiment," "various embodiments," "one embodiment," "at least one embodiment," "this and other embodiments," "certain embodiments," or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Heat losses in a building can be attributed to losses through the fabric of the building and losses due to ventilation. For instance, the second law of thermodynamics states that heat flows from hot areas to cold areas, and therefore heat from warm areas will flow out through the fabric of the building, such as the floors, walls, roofs, windows, and doors, to the colder areas (such as outside). Ventilation and infiltration bring outside air into the building, which forces out conditioned air that is already inside the building. During the winter months, the cold outside air replaces the warm inside air. The HVAC system therefore has to raise the temperature of the outdoor air to maintain the setpoint temperature within the building.

The preheat period discussed above typically occurs during periods of non-occupancy when neither fresh air nor any other external air source is intentionally introduced into a controlled space. Heating and cooling losses are also experienced during the preheat period. As evidenced in Equation 1 below, fabric losses can be calculated using measurements of both indoor and outdoor temperature. Calculations for preheat periods may therefore be a function of outdoor air temperature. For instance, during the winter months, the preheat period is longer when the outdoor temperature is, for example, 16° F. (−9° C.) than when the outdoor temperature is 43° F. (6° C.). A simplified equation for heat loss through any given surface may be calculated using Equation 1 below:

$$\text{heat loss } (W) = U \times A \times dT, \qquad \text{Equation 1:}$$

where:
U=thermal transmittance (U-value (W/m$^2$K))
A=area of surface (m$^2$)
dT=Indoor temperature−Outdoor temperature (K)

Various aspects and embodiments are directed to using air flow characteristics in controlling temperature in a controlled space. The heat losses attributed to ventilation and infiltration are largely attributed to air flow characteristics, such as volume of air flow, velocity of air flow, direction of air flow, air flow resistance, and the like. According to some embodiments, an example of the air flow characteristic is the "air change rate" (ACR) or "air changes per hour" (ACH). Typically, only fabric losses are used in the calculation of preheat time due to the difficulty in obtaining meaningful measurements of air flow characteristics, such as the ACR. In fact, typical preheat calculations assume that heat losses due to the ACR are constant, and in practice, air change and fabric losses are typically considered together as one parameter.

Air change is defined as the ratio of air supply Q(t) into a zone, such as a room or space, in relation to the volume of this zone $V_r$ (room volume) and is generally expressed as air change per hour or ACH (h$^{-1}$), and is expressed below by Equation 2.

$$\lambda(t) = Q(t)/V_r \qquad \text{Equation 2:}$$

where:
$\lambda(t)$ is the ventilation rate or ACR (h$^{-1}$)
Q(t) is the air supply into a room (m$^3$/h), and
$V_r$ is the room's volume
t=time (h)

The ventilation associated with heating (and cooling) losses may occur through either forced, i.e., use of a mechanical system, or may occur through natural ventilation. No forced ventilation occurs during the preheat period, meaning that only natural ventilation occurs. Natural ventilation is driven by the air-pressure difference between the interior and external environment and is characterized by a lack of a controlled, mechanical process of introducing fresh air supply (usually from outdoors) into a controlled space. Therefore, the value of the Q(t) term in Equation 2 may be very low during periods of non-occupancy, including the preheat period. Natural ventilation typically occurs via air infiltration through cracks, openings, doors, and windows. According to various aspects, since preheat periods occur during periods of time when the controlled space is unoccupied, both the preheat period and the non-occupancy period may be influenced by the same factors. Tracer gas concentration measurements taken during sample periods of non-occupancy may therefore be used to determine one or more air flow characteristics for the preheat period, such as the ACR.

In accordance with at least one embodiment, ACR is a factor in determining the preheat period. Thus, instead of assuming that air change losses are constant during the preheat period, various aspects of the invention may determine and use real time values of ACR to calculate more accurate preheat periods. According to one embodiment, real time ACR values may be obtained by using current wind condition data and referencing previous characterizations of ACR and wind condition data. The methods and systems described herein may therefore provide an improved control strategy for a building or other structure's HVAC system.

According to various aspects of the invention, outside wind condition data may be used in controlling the temperature of a control zone within a building. For instance, in some embodiments, outside wind condition data may be used in calculating an air flow characteristic, such as an ACR value, which may be used in a temperature control loop for a control zone. For instance, the calculated ACR value may be used in determining the preheat period for an HVAC system. According to one embodiment, the ACR may be a function of outdoor wind conditions, such as wind speed and/or direction. Real time wind condition data may be measured and used for determining ACR values, which may reduce errors associated with determining a preheat period.

Figure 2:
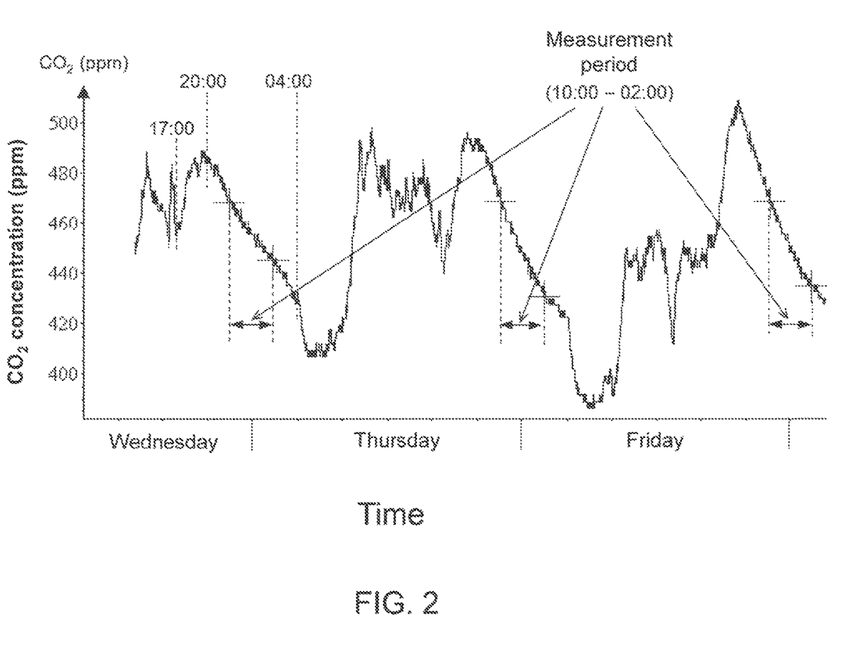
FIG. 2 is a graph showing an example of $CO_2$ concentration levels in a controlled space over a three-day period.

Typical methods for determining ACR in a control zone include the use of a tracer gas, such as carbon dioxide ($CO_2$). One such method is known as the concentration decay method and involves introducing a tracer gas into the control zone and then measuring the decay as a function of time. The ACR may then be determined based on these measurements. The tracer gas may be an easily measurable gas that can be readily detected in minute quantities. Non-limiting examples of tracer gases besides $CO_2$ include nitrous oxide ($N_2O$), sulfur hexafluoride ($SF_6$), hexafluorobenzene ($C_6F_6$), and argon (Ar). Carbon dioxide is inexpensive, non-toxic, and is easily detectable by affordable infrared gas analyzers, and therefore provides certain advantages as a tracer gas. It also has a high background concentration and is produced by occupants (such as humans) in the control zone during periods of occupancy. Therefore, during periods of occupancy, a control zone may be "charged" with carbon dioxide generated by human occupants. According to some embodiments, this human-generated $CO_2$ may be used as a tracer gas in determining ACR values. For instance, FIG. 2 shows the $CO_2$ concentration levels in an office building over a three-day period during the summer season. As shown, $CO_2$ concentrations generally increased on business days (Wednesday-Friday) during business hours when the space was occupied, and then declined overnight to natural levels (about 390 ppm) when the space was unoccupied.

According to some embodiments, instead of introducing a tracer gas such as $CO_2$ by injecting it into the space, $CO_2$ may be introduced via human occupants during a period of occupancy. $CO_2$ decay levels may then be measured during the period of non-occupancy. For instance, FIG. 2 includes three measurement or sample periods during which $CO_2$ concentration levels were measured from 10 pm to 2 am, which corresponded to periods of time when the space was unoccupied. Therefore, only natural ventilation occurred during these measurement periods. At 4 am on Thursday and Friday, hot internal air was expelled from the building before cooling was started, which also caused the $CO_2$ concentration levels to drop. Forced ventilation commenced at the start of occupancy. The measurement data shown in FIG. 2 also indicates that $CO_2$ concentration levels rose from about 5 pm to about 8 pm. This increase was due to the fact that forced ventilation (which input "fresh" air from the outside environment) was turned off at 5 pm, and without any fresh air, $CO_2$ levels continued to rise until about 8 pm, when the building was closed and everyone had left the building. The period of non-occupancy therefore began at 8 pm.

The slope of the line corresponding to the decay rate of $CO_2$ during the three measurement periods shown in FIG. 2 was not the same for each day. This variation in the decay rate was found to be attributed to the wind conditions (e.g., wind speed and/or direction) outside the building. Therefore, the results shown in FIG. 2 indicate that wind conditions can influence ACR values for a given controlled space. Not only can outdoor wind speed affect the ACR, but the wind direction can also affect the ACR in buildings that are zoned.

The concentration decay function is expressed below as Equation 3:

$$C(t)=C_0 * e^{-\lambda * t} \qquad \text{Equation 3:}$$

where:
$C_0$=initial tracer gas concentration at time t=0
$C(t)$=the concentration of tracer gas at time t
Nonlinear regression analysis may be applied to determine the ACR value k. Logarithmic concentration values may also be used to obtain a linear relationship between the logarithm of the tracer gas concentration and the time, as expressed below in Equation 4.

$$\ln C_i(t)=\ln C_0-\lambda*(t_i) \qquad \text{Equation 4:}$$

where:
$C_i(t)$=tracer gas concentration at time t
$C_0$=initial tracer gas concentration
$\lambda$=ACR
$t_i$=time The concentration decay curves for the tracer gas start with the initial concentration $C_0$ and decay exponentially until the constant background (ambient) tracer gas concentration is reached, if such a background concentration exists. In instances were $CO_2$ is the tracer gas, $C_i(t)$ will be the concentration of $CO_2$ above the ambient level. The ambient concentration of $CO_2$ is the natural level of $CO_2$ in the atmosphere, and varies based on not only the season, but has been found to be increasing across the globe on a yearly basis. In general, the ambient concentration of $CO_2$ is between 350 and 450 ppm, but may reach higher values depending on the season. For instance, according to certain aspects, the seasonal variation may vary by about 9 ppm.

According to one embodiment, the ambient concentration of $CO_2$ may be calculated based on the year and the season, and may be further adjusted manually based on a forecast level of $CO_2$. In certain instances, the ambient concentration of $CO_2$ may be determined from user settings. The ACR $\lambda$ value may be determined using the term derived from Equation 5 as shown below.

$$C(t)=(C_0-C_a)*e^{-\lambda*t}+C_a \qquad \text{Equation 5:}$$

where $C_a$ is the ambient $CO_2$ concentration, and again, nonlinear regression analysis may be applied to determine the ACR value $\lambda$. The linear relationship between the logarithm of the tracer gas concentration and time is expressed below in Equation 6.

$$\ln(C(t)-C_a)=\ln(C_0-C_a)-\lambda*t \qquad \text{Equation 6:}$$

In accordance with some embodiments, ACR values may be calculated via linear regression analysis according to Equation 4 or Equation 6, which is also the method described in ASTM E741-11 (Standard Test Method for Determining Air Change in a Single Zone by Means of a Tracer Gas Dilution). However, in certain instances when the background concentration is unknown, ACR values may be determined by nonlinear regression with iterative calculation methods according to the model as given in Equation 5. Iterative calculation methods start with initial values for the function parameters (which in some instances may be specified by the user or a computer system), which are then improved iteratively by using the method of least squares until the model function is fitted optimally to the measured curve.

According to at least one embodiment, the decay in concentration levels of human-produced carbon dioxide may be measured during a sample time interval to determine ACR values. Wind condition data may also be measured during the sample time interval and correlated with the $CO_2$ decay values and ACR values. The process may be repeated to provide a robust characterization of ACR and wind condition data that can be stored in a database or other data store or electronic storage medium. The correlated data may then be used in determining ACR values in real time using current, i.e., real time, wind condition data.

In some embodiments, the sample time interval for measuring tracer gas concentrations may occur when the control zone is unoccupied. The sample time interval may occur during an unoccupied period that follows a period of occupancy in a control zone. For instance, referring to FIG. 2, the sample time interval (labeled as "measurement period") occurs overnight, during a period of unoccupancy, after a period of occupancy. In some instances, the sample time interval may occur immediately after a period of occupancy, and in other instances, the sample time interval may commence once a predetermined period of time has elapsed after the period of occupancy. This predetermined period of time may be an hour or more after the period of occupancy. For instance, the measurement period in FIG. 2 commenced about two hours (at 10 pm) after the period of occupancy ended (at 8 pm). In accordance with various aspects, the sample time interval may occur when one or more of the following conditions apply: (1) after the control zone has been charged with a sufficient amount of tracer gas, such as carbon dioxide from human presence, (2) when the control zone is unoccupied by the presence of humans (or animals), (3) when there is no significant HVAC activity which might affect the measurement results, such as ventilation, or (4) windows and doors are in the same state (open or closed) as when the preheat period commences. Measurement data taken during a sample time period may be discarded if one or more of these criterion is not met. For instance, data may be discarded if the heating or cooling is implemented in the evening hours during a period of time that the building would otherwise be unoccupied in an instance where the temperature of the controlled space is increased or decreased for evening occupants. In this particular instance, both conditions (2) and (3) are not met.

According to at least one embodiment, the duration and frequency of the sample time interval is set or otherwise determined by a user, such as a building services manager. According to other embodiments, the sample time interval duration and/or frequency may be determined using sensor data. For instance, motion sensors may be used to detect human activity and thereby be used by a controller to determine when a period of non-occupancy occurs. According to some embodiments, the sample time interval may be determined using a combination of user input and sensor data. For example, a user may input a sample time interval of four hours, and sensor data may be used to determine when the period of non-occupancy starts, which in turn triggers the sample time interval.

In accordance with some embodiments, the sample time interval is in a range of about 1 hour to about 8 hours, although in certain instances the sample time interval may be longer than 8 hours. Longer sample time periods may be necessary when the rate of decay of the tracer gas is very low, meaning that the ACR values are also low. This may occur in instances where air leakage into the building is low, or there is little or no wind Likewise, shorter sample time periods may be used in instances where the air leakage into the building is high or if it is very windy. If the sample time interval is too long, then changing wind conditions may skew the measurement data or even invalidate it. Therefore, besides the criteria discussed above, another condition for the sample time interval may be that the sample time interval occurs during a time interval where wind conditions are relatively stable.

According to some embodiments, the sample time interval is in a range of about four hours to about five hours. During the sample time interval, one or more measurements of tracer gas concentration levels, such as $CO_2$ concentration values, are obtained. According to some embodiments, measurements may be made at periodic intervals, such as every 5, 10, 15, or 20 minute intervals. Measurement data taken more frequently allows for less noise in the measurement results. According to some embodiments, measurements of tracer gas concentration levels are made continuously, meaning that the sensor device continuously measures tracer gas levels without interruption and is limited only by the amount of time the sensor device takes to measure and record and/or output the measured value. In some embodiments, the tracer gas concentration may be measured by an infrared (IR) sensor (otherwise referred to herein as an IR detector). During the sample period, doors and windows may be kept closed in the control zone and fans and other mixing devices may be turned off. Thus, the tracer gas is assumed to be completely mixed inside the control zone, i.e., there are no concentration gradients and the concentration of the tracer gas at a given time is the same for the whole room or control zone.

In accordance with at least one embodiment, wind condition data external to the building or structure housing the control zone is also measured or otherwise logged during the sample time interval. Wind condition data may include wind speed or wind speed velocity, and/or wind direction. In certain instances, the wind conditions data may be measured at the same time as the tracer gas concentration, but in other instances wind conditions may be measured at a different time or at a different periodic time interval during the sample time interval than the tracer gas concentration. The wind condition data may be measured at least once during the sample time interval and may be measured by a sensor, such as a wind sensor. For instance, wind speed and/or direction may be measured by an anemometer and wind direction may be measured by a wind vane or windsock. One or more sensors may be placed external to the building, at a location that is associated with the building, such as mounted to the roof of the building or the ground next to the building.

According to some embodiments, wind condition data for the sample time interval may be obtained from external sources, such as meteorological web sites of local weather stations. These values may be manually obtained and recorded by a user, or received and recorded automatically from a computer or other device. For instance, a controller may be configured to receive wind condition data from an external source, such as a web site and/or weather station. According to some embodiments, wind condition data may be measured multiple times during the sample time interval and then averaged. For instance, 10 wind speed measurements taken during a given sample period may be averaged together to give one wind speed value for the sample time interval. Other averaging techniques for wind condition data are discussed below. Wind measurement data taken during a sample time interval may be discarded in instances where major changes in wind conditions occur, such as when a weather front moves through the area. According to some embodiments, wind measurements may be obtained by averaging over time periods of 2 to 10 minutes.

In accordance with various aspects, one or more different types of averaging techniques may be applied to the wind condition data to average the wind speed and direction measurement data. According to one embodiment, the average wind speed is the scalar average of the wind speed measurements, and a "unit-vector" average may be used to calculate the average wind direction. According to this technique, unity serves as the length of the vector, and the wind direction observations serve as the orientation of the vector. The u component (the zonal velocity) and the v component (the meridional velocity) may then be calculated for each measurement. The sum of the u and v components may then be calculated and the average wind direction may be derived from the arctan of the sum of the u components divided by the sum of the v components: arctan(sum u/sum v). According to another embodiment, average wind speed and direction may be determined using a true vector average. According to this technique, the magnitude of the vector is represented by the wind speed observation and the direction observations are used for the orientation. The vectors may then be broken down into their u and v components. All u and v components may then be averaged separately. The average wind speed may be calculated from the Pythagorean Theorem (i.e., wind speed=SQRT(u $avg^2$+v $avg^2$) and the wind direction may be derived from arctan(u avg/v avg).

In accordance with various aspects, one or more conditions may need to be met in order for data associated with each sample time interval to be saved and stored for use in a control strategy for a building's HVAC system. The data collected from the sample time interval may therefore be analyzed to determine if it may be saved and used in a control strategy. For instance, adequate initial tracer gas concentration levels may need to be present in order to obtain an accurate tracer gas decay curve. In instances where $CO_2$ is used, adequate initial concentration levels need be present in a sample period that occurs immediately or shortly after the building was occupied. According to one embodiment, an initial $CO_2$ concentration level is at least 450 ppm. An adequate initial $CO_2$ level may also depend on the air leakage level of a building, and therefore this value may be dependent on the type and physical make-up of the building. The sample time interval must also be of a minimum duration so as to produce accurate concentration decay data. According to some embodiments, the minimum duration may be at least one hour. Further, the data may be checked to confirm that the measurement data is consistent, meaning that multi-point samples are on the same decay curve, i.e., that there is not a disproportionate number of "outlier" values. The wind condition data may also be verified to confirm that wind speed and direction readings are consistent, meaning that the weather conditions did not change drastically during the sample time interval.

For each sample time interval, the concentration decay data may be used to determine an ACR value. For instance, ACR values may be calculated via linear regression analysis according to Equation 4 or Equation 6. The ACR value and wind speed condition data for the sample time interval may then be stored in a database or other data store or data structure. According to some embodiments, the data structure may index the measured wind condition data with the ACR value for the sample time interval. The database may take the form of any logical construction capable of storing information on a computer readable medium including, among other structures, flat files, indexed files, hierarchical databases, relational databases, or object databases. According to various aspects, the data may be modeled using unique and foreign key relationships and indexes. The unique and foreign key relationships and indexes may be established between the various fields and tables to ensure both data integrity and data interchange performance.

Multiple sample time intervals may be used to populate the database to obtain a full characterization of the correlated data associated with the correlation between ACR and wind conditions. For instance, Table 1 below is an example of such a database. According to various aspects, wind direction data may have an eight-point resolution (N, S, E, W, NE, SE, SW, NW), and Table 1 has also been structured to include eight-point resolution for the wind direction. The wind speed has been structured in Table 1 to include 5 mph increments, although it will be appreciated that other degrees of resolution (i.e., other increments) are within the scope of this disclosure. For a sample time interval with any given wind speed and direction, a value for ACR may be determined and stored in the database. These values may function as "reference" ACR values. Table 1 below is therefore populated with the calculated (reference) ACR value associated with the corresponding wind speed (columns) and wind direction (rows). As will be understood, the correlated data between the wind condition data and the reference ACR values may be structured and arranged in an infinite number of ways, and may be dependent upon a particular climate or building structure. Table 1 is therefore just one example of a particular configured arrangement. For instance, in particularly "windy" regions, the wind speeds may regularly exceed 30 mph, and in some applications, wind speed may be incremented in units smaller or larger than 5 mph.

TABLE 1

Correlated ACR [ACH] and wind condition data

| Wind direction | Wind Speed (mph) | | | | | |
|---|---|---|---|---|---|---|
| | 0-5 | 6-10 | 11-15 | 16-20 | 21-25 | 26-30 |
| N | 0.2 | 0.6 | 1.0 | 1.5 | 2.1 | 2.8 |
| S | 0.2 | 0.7 | 1.0 | 1.4 | 2.0 | 2.7 |
| E | 0.1 | 0.5 | 0.9 | 1.3 | 1.8 | 2.2 |
| W | 0.1 | 0.5 | 0.8 | 1.2 | 1.7 | 2.2 |
| NE | 0.1 | 0.3 | 0.6 | 0.9 | 1.1 | 1.4 |
| NW | 0 | 0.5 | 0.7 | 1.1 | 1.4 | 1.7 |
| SE | 0 | 0.2 | 0.4 | 0.6 | 0.8 | 1.0 |
| SW | 0.1 | 0.5 | 0.7 | 1.1 | 1.4 | 1.7 |

In certain embodiments, data from multiple sample time intervals may be averaged. For instance, the concentration decay curves for 10 sample time intervals indicating wind speeds of 15-17 mph and a wind direction from the north (N) may give 10 slightly different reference ACR values that may be averaged together. According to various aspects, the correlated values between the wind condition data and the reference ACR values may be updated using recursive averaging. Averaging may function to reduce the error associated with the reference ACR value, which in turn may be cited and used for an operating time interval, as discussed further below.

The correlated data between the wind condition data and the reference ACR values obtained for the sample time interval may be used to obtain an ACR value, otherwise referred to herein as an "operating" ACR value, for any given set of wind condition data associated with an operating time interval. For instance, if the operating time interval occurs in real time, then real time values may be obtained for wind speed and direction and a real time operating ACR value may be determined based on the stored correlated data. If the operating time interval occurs in the future, predicted operating ACR values may also be obtained based on forecast conditions for the wind condition data. According to some embodiments, the operating time interval corresponds to at least a portion of a temperature control loop for a control zone. For instance, according to certain aspects, the operating time interval may include a preheat period. In some instances, the operating time interval may include at least a portion of the preheat period. In other instances, the operating time interval immediately precedes the preheat time interval.

According to some embodiments, the correlated values between the wind condition data and the reference ACR values obtained for the sample time interval may be evaluated or otherwise analyzed to determine if the data can be modeled as a trendline. For instance, the correlated data may be analyzed to determine if the data fits best to one of a straight line, polynomial, or logarithmic trendline. Trendlines having the best fit (e.g., highest R-squared value) may then be used to determine an operating ACR value. As an example, Table 1 features ACR values that fit a linear trendline for each wind direction that is expressed by y=mx+b, where y=wind speed and x=ACR. The "m" is the slope and "b" is the y-axis intercept, both of which are unknown until the sample time interval data is fitted to the trendline. Thus, for any given operating time interval having known wind condition data (either measured by a sensor on-site or obtained from an external source), "x" (the operating ACR value) can be obtained using the slope m and y-axis intercept b determined from the trendline generated by the sample time interval data. As will be appreciated, a similar approach may be performed for polynomial and logarithmic trendlines.

Figure 3:
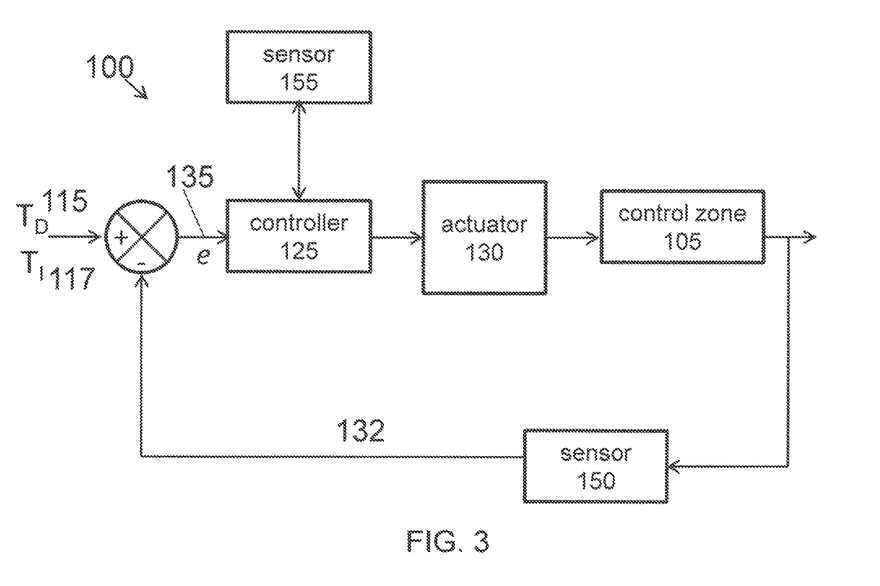
FIG. 3 is a schematic illustration of a system according to one or more aspects of the invention.

Referring to FIG. 3, a system, generally indicated at 100, is shown that employs the use of a temperature control loop. The system 100 includes a controller 125 that controls the temperature of a control zone 105. The control zone 105 may be located within a building or structure, such as an office building or residence. The control zone 105 includes at least one wall that forms, at least in part, the dimensions of the control zone. The control zone 105 may also include a ceiling, floor, doors, windows, or other structures that define the dimensions of the control zone.

Controller 125 may be programmed or otherwise feature a temperature control loop for controlling the physical characteristics of the air in control zone 105. For instance, the temperature control loop may be a closed-loop type of temperature control loop where a setpoint temperature ($T_D$) 115 is set by a user using an interface, such as a graphical user interface, coupled to the controller 125. The setpoint temperature 115 corresponds to a desired temperature of the control zone 105. The setpoint temperature 115 may be a temperature that reflects the desired level of comfort that a user wishes to experience while living or working or otherwise spending time within the control zone 105. In certain instances, the setpoint temperature 115 may also be a temperature that corresponds with safe or optimum working conditions for various pieces of equipment.

System 100 also includes at least one sensor 150. In certain instances, the sensor 150 may be positioned at one or more locations within the control zone 105. The sensor 150 may be configured to measure and transmit information related to any one of a number of physical characteristics of the air within the control zone 105, such as temperature and/or humidity. For instance, the sensor 105 may measure the temperature of the control zone 105 and then transmit this information to the controller 125 in the form of a feedback signal 132. The controller 125 uses the feedback signal 132 transmitted by the sensor 150 to determine a deviation 135 (or error e). The deviation 135 is used by the controller 125 to control the physical characteristics, such as temperature, of the air in control zone 105 using the actuator 130. The actuator 130 may house or otherwise be in communication with one or more physical components of the HVAC system, such as the heater, cooler, fan, damper system, valves, ducts, etc. that perform the thermal (or humidity) functions of heating and cooling air that is delivered to the control zone 105.

The deviation (e) 135 represents the difference between the actual measured values transmitted by the sensor 150 and the setpoint value 115 set by the user. The existence of a deviation may result in the controller transmitting control signals to the actuator 130 to adjust one or more parameters of the air delivered to the control zone 105. For instance, if the measured temperature transmitted by the sensor 150 is below the setpoint value 115, then the controller 125 may send a control signal to the actuator to increase the temperature in the control zone 105, such as by activating a heater to send heated air into the control zone 105. According to some embodiments, the controller 125 may be configured to "request" or otherwise obtain information about the air in the control zone 105 via the sensor 150 and feedback signal 132 at periodic intervals. For example, the controller may request feedback information every 15 minutes. The periodic intervals may occur at a frequency such that the temperature of the air in the control zone does not fluctuate drastically. For instance, the system may be configured so as to ensure that the temperature of the air in the control zone stays within ±1° C. of the setpoint value 115. In other embodiments, the controller may continuously obtain information via the feedback signal 132.

System 100 also includes at least one sensor 155 that is configured to transmit data to the controller 125 and receive control signals from the controller 125. The at least one sensor 155 may be any sensor that contributes to the functionality of controller 125 in controlling the air inside the control zone 105, and may include multiple types of sensors. For example, according to some embodiments, the at least one sensor 155 may be a tracer gas concentration sensor that receives a control signal from the controller 125 to measure the concentration of tracer gas in the control zone during the sample time interval and then transmit the measured values back to the controller 125. The controller 125 may then use the measured values to calculate the decay curve associated with the tracer gas and subsequently apply the calculated air flow characteristic, such as ACR, to a temperature control loop for the control zone 105. According to another embodiment, the at least one sensor 155 may be configured to measure wind condition data and transmit the measured values to the controller 125. In certain instances, the at least one sensor 155 may be configured to receive control signals from the controller 125 to measure wind condition data.

The at least one sensor 155 may be positioned on-site, such as on the roof of the building that contains the control zone, and/or on the ground adjacent the building, and/or in the control zone 105. In some instances, the at least one sensor 155 may be positioned off-site, such as at a weather station, and may therefore receive control signals to measure wind condition data from a separate controller than controller 125. In this case, the at least one sensor 155 (which is positioned off-site) may be configured to transmit the measured wind condition data to the controller 125, or may be configured to transmit the measured wind condition data to a different controller and/or computer system that then transmits the measured wind condition data to controller 125 (not shown in FIG. 3). The controller 125 may then use the measured wind condition data in determining air flow characteristics, such as the ACR, and apply the air flow characteristic to a temperature control loop for the control zone 105.

The temperature control loop used by the controller 125 in system 100 may also feature a preheat period. Instead of the setpoint temperature ($T_D$) 115, the target start of occupancy temperature ($T_I$) 117 may be used as the target temperature for the temperature control loop, as shown in FIG. 3. The target start of occupancy temperature 117 may be set by a user and received by the controller 125 in a similar way as described above in reference to the setpoint temperature 115. In some instances, the control loop will operate in a similar manner as discussed above, but with a different target temperature (i.e., $T_I$ instead of $T_D$). In some embodiments, the deviation 135 may be used by the controller 125 to control the physical characteristics, such as temperature, of the air in control zone 105 using the actuator 130. The actuator 130 may house or otherwise be in communication with one or more physical components of the HVAC system, such as the heater, cooler, fan, damper system, valves, ducts, etc. that perform the thermal functions of heating and cooling air that is delivered to the control zone 105. According to some embodiments, the control loop during the preheat period will contain minimum or no feedback, and therefore the deviation 135 is not used by the controller. For instance, during the preheat period, the heating or cooling elements, as well as other components associated with the actuator 130, such as fans, valves, etc. may be instructed by the controller 125 to operate at maximum capacity in an effort to bring the temperature in the control zone to the target start of occupancy temperature 117. Therefore, during the preheat period, the controller may not request feedback information via the sensor 150 and feedback signal 132. According to this particular example, the concept of "control" during this period may therefore be associated with the time at which to commence the preheat period. The preheat period typically ends when either the start of occupancy begins, or when the occupancy temperature is reached, whichever is sooner. In some instances, the time point at which occupancy begins and the time point at which the occupancy temperature is reached occur simultaneously or near simultaneously. Once the time of occupancy begins, the controller 125 may request information about the air in the control zone 105 via the sensor 150 and feedback signal 132 at periodic intervals and will therefore use the deviation 135 as part of a temperature control loop. For instance, referring to FIGS. 1 and 3, at the time that occupancy begins at $\Theta_3$, the control loop may use setpoint temperature 115 as the target temperature and re-commence a feedback loop using sensor 150 and feedback signal 132.

As previously discussed, during the preheat period, no forced ventilation occurs, so different components of the actuator 130 may be used than at other times, such as during periods of occupancy when mechanical ventilation is used to bring fresh air into the control zone 105. Therefore, once outdoor wind condition data is obtained for an operating time interval, the reference ACR value obtained during the sample time interval may be used in determining the preheat period. The controller 125 may be configured to determine the preheat period and send signals to the actuator 130 and thereby control one or more components of the HVAC system for the duration of the preheat period. For instance, once the starting time of the preheat period is determined, the controller may activate a heater that starts to heat the control zone at the calculated start of the preheat period. According to some embodiments, the controller 125 may also receive during the preheat period periodic measurements from the sensor 150 and adjust the setting on the heater or other components (via actuator 130) that are responsible for raising the temperature of the control zone to ensure that the target start of occupancy temperature is reached by the end of the preheat period, when occupancy begins. In other embodiments, the controller 125 controls via the actuator 130 one or more components such as the heating or cooling elements, to operate at maximum capacity, as discussed above, and therefore does not receive measurements from sensor 150 or determine the deviation 135. At the end of the preheat period, the controller may also adjust or otherwise control components of the HVAC system (via actuator 130) to stop heating the control zone at the preheat rate.

According to at least one embodiment, an empirical method may be used for determining the preheat period. For example, the preheat period may be determined according to Equation 7 below:

$$\text{Preheat time} = P(\theta_I - \theta_C) + P_O(\theta_I - \theta_O) \qquad \text{Equation 7:}$$

where:

$\theta_I$ is the target start of occupancy temperature (° C.) (referred to as $t_i$ in FIG. 1 and $T_I$ in FIG. 3)
$\theta_C$ is the temperature of the controlled space (° C.)
$\theta_O$ is the outside temperature (° C.)
P is the preheat ratio (min/° C.)
$P_O$ is the preheat ratio for outside influence (min/° C.)

The values for the preheat ratios P and $P_O$ may be dependent on building characteristics, such as the thermal characteristics of the building, including construction materials and contents of the building. The preheat ratio P can generally be described as the time at which the building is expected to either heat or cool per hour. For instance, if the preheat ratio P is 25 minutes/° C., then the building will take about 25 minutes to either raise the temperature by 1° C. (for heating) or decrease the temperature by 1° C. (for cooling). According to this example, if the difference between the current building temperature and the desired temperature is 5° C., then it will take about two hours and five minutes to reach the desired building temperature. However, this assumes a linear relationship, and the heating characteristics of buildings are typically not linear. Therefore, each building will have its own unique heating and cooling characteristics that can be taken into account when determining the value of the preheat ratio value P.

The preheat ratio for outside influence $P_O$ takes into account the outside temperature when determining how long it will take the building to either heat or cool per hour. For example, on colder days, it may take longer for the desired heating temperature to be reached, and on warmer days, it may take longer for the desired cooling temperature to be reached. $P_O$ can therefore be a positive or negative adjustment on the preheat time. Typically, a calculation is performed to determine what the outside influence will be. For instance, a base temperature may be established to determine a "cold day" and each ° C. drop below this base temperature increases the preheat time by a certain number of minutes. As an example, if the base temperature is established to be 10° C., and the actual outside temperature is 5° C., and if each ° C. below 10° C. is determined to increase the preheat period by 5 minutes, then the preheat time will be extended by 25 minutes due to the outside influence.

According to various aspects, the preheat ratio values P and $P_O$ may be entered by a user. According to another embodiment, physical characteristics of the building may be entered by a user and a computer (such as controller 125) may calculate or estimate the preheat ratios P and $P_O$. In some embodiments, controller 125 may "tune" an initial value for the preheat ratios to affect the accuracy of the preheat time calculation.

According to at least one embodiment, an additional term may be added to Equation 7 to account for the ACR value, as shown below in Equation 8:

$$\text{Preheat period} = P(\theta_I - \theta_C) + P_O(\theta_I - \theta_O) + K\lambda(\theta_I - \theta_O) \qquad \text{Equation 8:}$$

where:

K is a constant entered by the user (° C$^{-1}$)
$\lambda$ (h$^{-1}$) is the ACR value obtained using wind condition data, as described above According to various aspects, the $K\lambda$ term in Equation 8 can be viewed as the preheat ratio for ventilation losses, which takes into account how windy the external environment is when determining how long it will take the building to either heat or cool on a per hour basis. In a similar manner as the preheat ratios P and $P_O$ discussed above, the $K\lambda$ term may be a function of the building's thermal characteristics. Using a specific example to illustrate, if the target start of occupancy temperature $\theta_I$ is 20° C., the current temperature of the controlled space $\theta_C$ is 17° C., the outside temperature $\theta_O$ is 0° C., the preheat ratio P is 25 min/° C., the preheat ratio for outside influence $P_O$ is 0.38 min/° C., $\lambda$ has a value of 3 min$^{-1}$ (a windy day) and K has a value of 0.07° C.$^{-1}$, then the first term of Equation 8 is 75 minutes, the second term is 7.6 minutes, and the third term is 4.2 to give a total preheat period of 86.8 minutes. According to some embodiments, K has a value of 0.1° C$^{-1}$.

According to another embodiment, a model based function or approach may be used to determine the preheat period. In some instances, the model considers an effective thermal mass of the building so that internal air temperature may be used instead of a mean fabric temperature, as described in *Simple Model for an Optimiser*, by G. J. Levermore, Building Services Engineering Research and Technology, August 1988, Vol. 9, No. 3, pp. 109-116. This model effectively ignores the building's air, apart from heat loss and calculates the temperature at the start of the preheat period ($T_1$ in FIG. 3) according to Equation 9 below:

$$\frac{p\dot{Q}_d}{K(1-e^x)+e^x p\dot{Q}_d/(\theta_l-\theta_o)}+\theta_o \qquad \text{Equation 9:}$$

where:
K is the building's heat loss (fabric and ventilation) (W K$^{-1}$)
$\dot{Q}_d$ is the design condition heat loss and is given by $\dot{Q}_d$=K $(\theta_l-\theta_{omin})$, where $\theta_{omin}$ is the design minimum outside temperature (W)
p is the heating plant size ratio, i.e., the ratio of the heating plant output to the design condition heat loss
$p\dot{Q}_d$ is the heating plant heat output (W)

$$x = \frac{\Theta_3 - \Theta_1}{\tau}$$

where:
$\Theta_3$ is the time at the start of occupancy (refer to FIG. 1)
$\Theta_1$ is the time at the end of occupancy (refer to FIG. 1)
$\tau$ is the time constant (s), and is equal to Q'/K where Q' is the effective thermal capacity of the building (heat stored in internal and external fabric at steady state condition/ $(\theta_l-\theta_{omin})$)
Equation 10 describes the heating of the building when the heating is turned on:

$$Q'\frac{d\theta}{d\Theta} = p\dot{Q}_d - K(\theta - \theta_o) \qquad \text{Equation 10:}$$

Integrating Equation 10 between the times shown in FIG. 1 gives Equation 11:

$$\frac{\Theta_3 - \Theta_1}{\tau} = -\ln\left(\frac{p\dot{Q}_d - K(\theta_d - \theta_o)}{p\dot{Q}_d - K(\theta_p - \theta_o)}\right) \qquad \text{Equation 11:}$$

where $\theta_p$ is the temperature at the start of the preheat period ($T_I$ in FIG. 3) The preheat time can therefore be determined by substituting Equation 10 into Equation 11.

According to one embodiment, the heat losses K for the model described above may be expressed as shown in Equation 12:

$$K=K_f+K_a \qquad \text{Equation 12:}$$

where:
$K_f$ is the fabric heat loss (W K$^{-1}$)
$K_a$ is the ACR heat loss (W K$^{-1}$) and is described by Equation 13:

$$K_a=rV\lambda/3600 \qquad \text{Equation 13:}$$

where
r is the heat per volume (J K$^{-1}$ m$^{-3}$) (this value is 1200 for air)
V is the control space volume (m$^3$)

Figure 4:
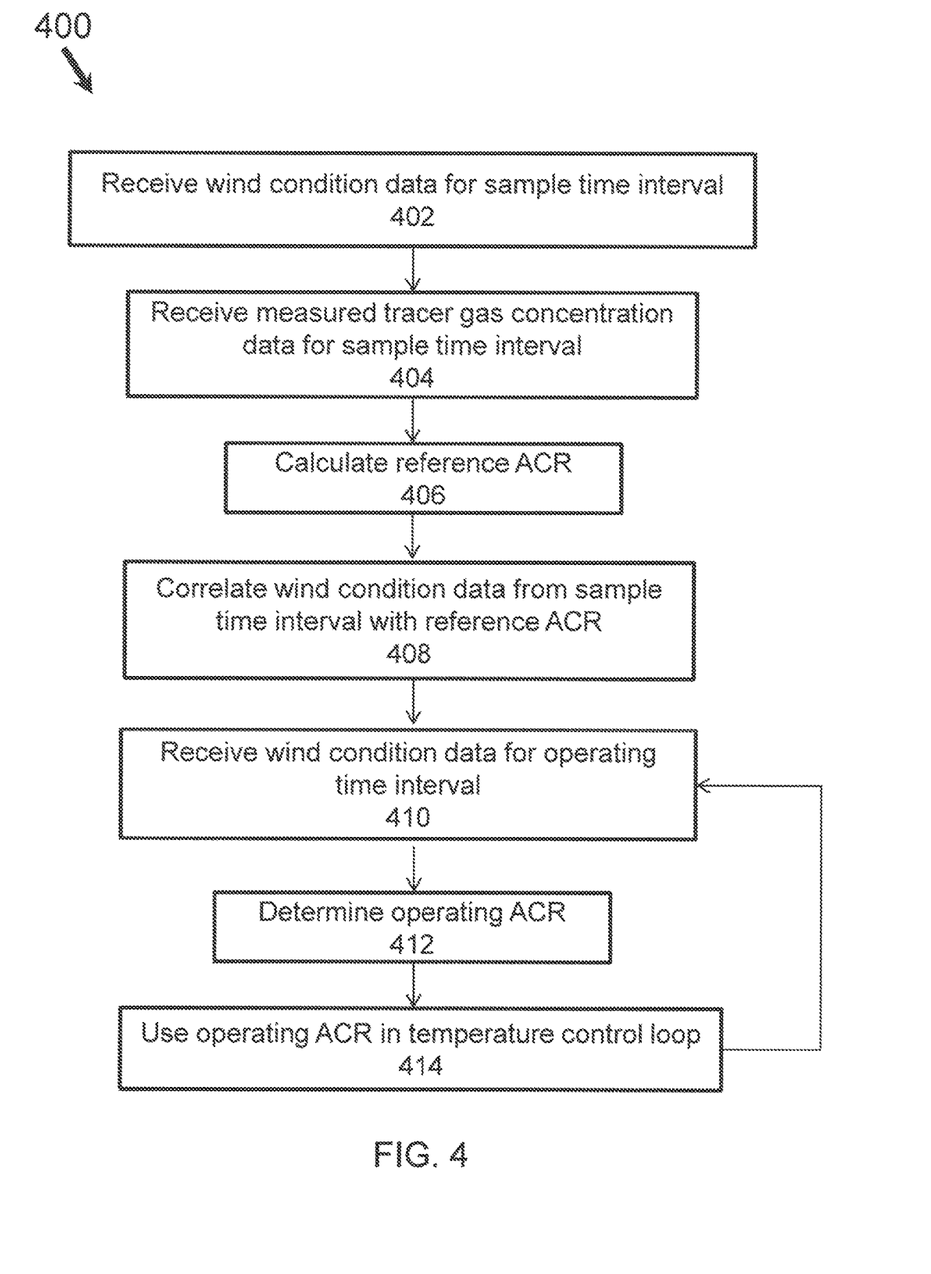
FIG. 4 is a flow chart of a method according to one or more aspects of the invention.

FIG. 4 is a flow chart of a method 400 according to one embodiment. In act 402, wind condition data, such as wind speed and/or wind direction may be received for a sample time interval. The wind condition data may be received using measurements taken on-site using an on-site wind sensor, or the measurements may be taken off-site and received from a local weather station or other external source, as described above. One or more measurements associated with the wind conditions associated with the sample time interval may be received. In act 404 tracer gas concentration data may be received for the sample time interval. For instance, the sample time interval may occur after a period of occupancy where the air within the control zone was "charged" with carbon dioxide generated by human occupants. After the human occupants leave, the sample time interval may begin and the resulting decay in the concentration of $CO_2$ may be recorded.

As discussed further below, a controller may receive both the wind condition data and the gas concentration data for the sample time interval. In act 406 a reference ACR for the sample time interval may be calculated. For instance, a controller or other computing device may use Equations 4 or 6 above and the concentration decay data taken during act 404 to calculate the reference ACR value. In act 408, the reference ACR value is correlated with the wind condition data from the sample time interval. According to some embodiments, a database may be generated that stores the wind condition data and reference ACR values. The database may index the measured wind condition data with the calculated reference ACR value for the sample time interval, such as the example shown in Table 1. A trendline may also be generated that correlates the reference ACR value and the measured wind condition data, as previously discussed.

In act 410, wind condition data for an operating time interval may be received. For instance, the operating time interval may occur during a period when the control zone is not occupied, and in certain instance may correspond with a preheat period. Wind condition data taken during this operating time interval may be used by a controller to determine an operating ACR value in act 412 based on the correlated wind condition data and the reference ACR value. In some embodiments, the operating time interval may occur in real time, and these real time conditions may subsequently be used to obtain a real time operating ACR value. In some embodiments, the controller may use the wind condition data received for the operating time interval and compare this wind condition data against wind condition data stored in the database. For instance, the controller may search the database for the corresponding wind conditions associated with the sample time interval, and the resulting corresponding reference ACR value is determined as the operating ACR value. In other embodiments, the controller may use the wind condition data received for the operating time interval and apply it in an equation, such as an equation associated with a trendline that correlates the wind condition data and reference ACR values determined during the sample time interval. The trendline equation may then be used to obtain the operating ACR value. In act 414 the operating ACR value may be used in a temperature control loop. For instance, a controller may use the operating ACR value for purposes of calculating the start of the preheat period using an empirical method or a model based approach as discussed above. The controller may therefore activate one or more components of an HVAC system at the start of the calculated preheat period to bring the temperature in the control zone up (or down) to the target start of occupancy temperature $T_I$.

As indicated in FIG. 4, once the wind condition data and reference ACR values are correlated with one another in act 408, acts 410-414 can be repeated for a different operating time interval. For instance, steps 410-414 may be performed once during a 24-hour period for purposes of determining a preheat period that occurs in the early morning hours before a period of occupancy begins. Real time wind condition data may be obtained during a period of non-occupancy, which may be used in determining the operating ACR value and subsequent preheat period characteristics (e.g., start of the preheat period, duration of preheat period, etc.).

Process 400 depicts one particular sequence of acts in a particular embodiment. The acts included in these processes may be performed by, or using, one or more computer systems as discussed herein. Some acts may be optional and, as such, may be omitted in accordance with one or more embodiments. Additionally, the order of acts can be altered, or other acts can be added, without departing from the scope of the embodiments described herein. For instance, act 404 may be performed before 402, or acts 402 and 404 may be performed simultaneously.

In accordance with some embodiments, the method 400 may be performed without obtaining tracer gas concentration decay data. For instance, $CO_2$ sensor data may be omitted and the correlation between wind speed and ACR may be entered manually as an estimate, and then "tuned" by the system to obtain a more accurate ACR value.

According to some embodiments, other factors may also be used in determining the preheat period. For instance, in some embodiments, fabric losses (and hence, the outdoor temperature) may also be used in conjunction with the operating ACR value in determining the preheat period.

It will be appreciated that other methods for determining reference ACR values besides the concentration decay method are also within the scope of this disclosure. For instance, a constant injection method may be used, where a defined amount of tracer gas is constantly emitted over a specified period of time. The tracer gas concentration increases with time and reaches a stable equilibrium value, which is a function of the room volume, the ACR, and the emission rate. The time to reach equilibrium values depends on ACR. A constant concentration method may also be used for determining ACR, where the tracer gas is released and constantly and thoroughly mixed with indoor air until a predefined concentration is reached. The tracer gas concentration is kept constant through the entire measurement period using an automated dosing and control system. The air supply rate can be calculated from the ratio of the tracer gas supply to the tracer gas concentration. Since the room volume is known, the ACR can be calculated from this ratio.

In some embodiments, one or more of the methods disclosed herein may be implemented on a computerized control system. Various aspects may be implemented as specialized software executing in a general-purpose or specialized computer system 500 such as that shown in FIG. 5. The computer system 500 may include a processor 502 (also referred to herein as a controller) connected to one or more memory devices 504, such as a disk drive, solid state memory, or other device for storing data. Memory 504 is typically used for storing programs and data during operation of the computer system 500.

Figure 5:
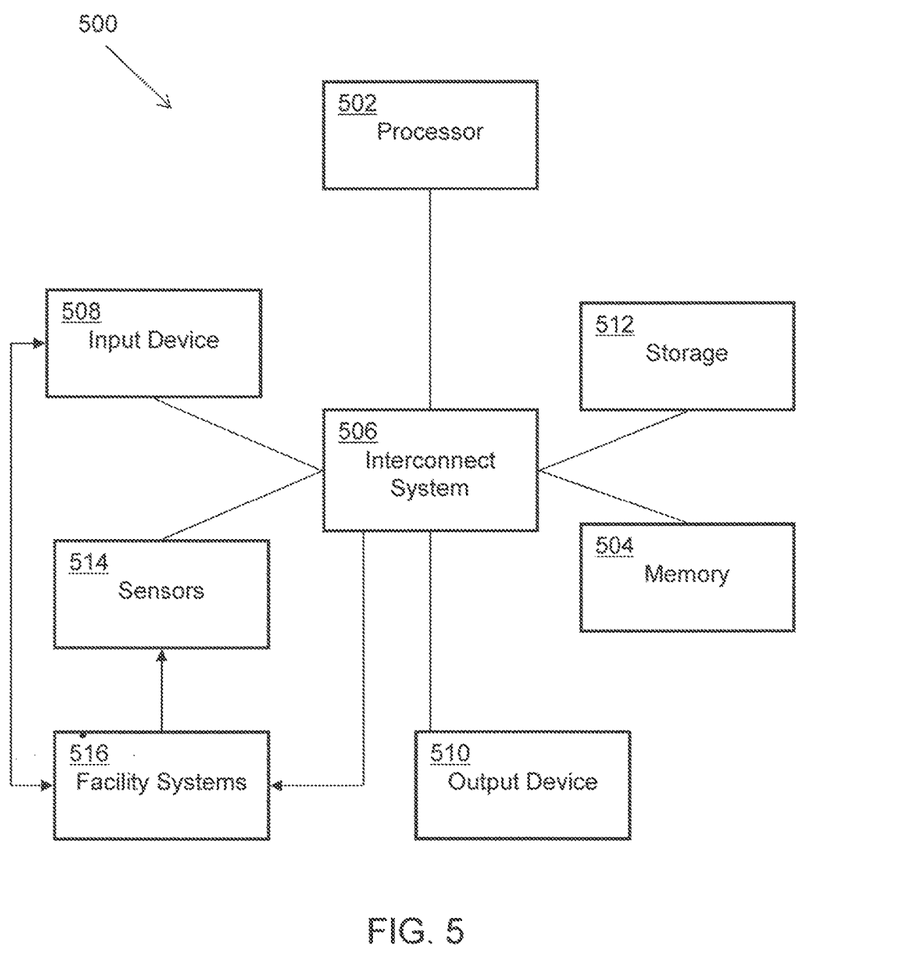
FIG. 5 is a schematic illustration of a computer system upon which methods disclosed herein may be performed.

Components of computer system 500 may be coupled by an interconnection mechanism 506 (also referred to herein as an interconnect system), which may include one or more busses (e.g., between components that are integrated within a same machine) and/or a network. The interconnection mechanism 506 enables communications (e.g., data, instructions) to be exchanged between system components of system 500. Computer system 500 includes one or more input devices 508, for example, a keyboard, mouse, trackball, microphone, or touch screen through which a user may issue commands, data input, or programming to the system 500. In some embodiments the computer system 500 may include or be coupled to or in communication with one or more input devices 508 configured to communicate with facility systems 516 of a facility, for example, an HVAC system. Computer system 500 includes one or more output devices 510, for example, a printing device, display screen, and/or speaker. In some embodiments, the computer system 500 may include or be coupled to or in communication with the interconnection mechanism 506 to provide control signals to adjust one or more operating parameters of facility systems 516 of a facility. One or more sensors 514 may also provide input to the computer system 500. These sensors may include, for example, sensors which are capable of or are configured to measure one or more environmental parameters of a control zone, such as temperature and/or humidity. These sensors may also include sensors which are capable of or configured to measure wind condition data, such as wind speed and/or wind direction or tracer gas concentration. In addition, computer system 500 may contain one or more interfaces (not shown) that connect computer system 500 to a communication network in addition to or as an alternative to the interconnection mechanism 506. These interfaces may be utilized by the central processing unit to collect data, for example, wind condition data, from an external source such as a wind reporting service web site on the Internet.

Figure 6:
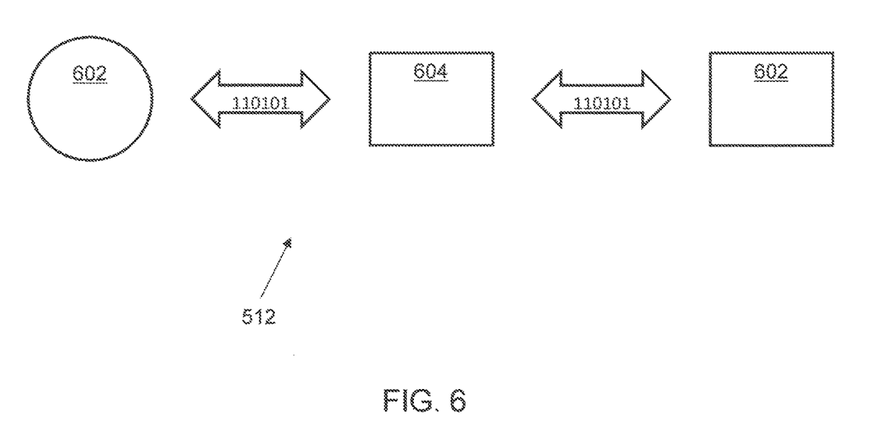
FIG. 6 is a schematic illustration of a memory system for the computer system of FIG. 5.

The storage system 512, shown in greater detail in FIG. 6, typically includes a computer readable and writeable nonvolatile recording medium 602 in which signals are stored that define a program to be executed by the processor or information to be processed by the program. The medium may include, for example, a disk or flash memory. Typically, in operation, the processor causes data to be read from the nonvolatile recording medium 602 into another memory 604 that allows for faster access to the information by the processor than does the medium 602. This memory 604 is typically a volatile, random access integrated circuit memory such as a dynamic random access memory (DRAM) or static memory (SRAM). It may be located in storage system 512, as shown, or in memory system 504. The processor 502 generally manipulates the data within the integrated circuit memory 604 and then copies the data to the medium 602 after processing is completed. A variety of mechanisms are known for managing data movement between the medium 602 and the integrated circuit memory element 604, and embodiments disclosed herein are not limited to any particular data movement mechanism. Embodiments disclosed herein are not limited to a particular memory system 504 or storage system 512.

The computer system may include specially-programmed, special-purpose hardware, for example, an application-specific integrated circuit (ASIC). Embodiments disclosed herein may be implemented in software, hardware or firmware, or any combination thereof. Further, such methods, acts, systems, system elements and components thereof may be implemented as part of the computer system described above or as an independent component.

Although computer system 500 is shown by way of example as one type of computer system upon which various embodiments disclosed herein may be practiced, it should be appreciated that the embodiments disclosed herein are not limited to being implemented on the computer system as shown in FIG. 5. Various embodiments disclosed herein may be practiced on one or more computers having a different architecture or components that that shown in FIG. 5.

Computer system 500 may be a general-purpose computer system that is programmable using a high-level computer programming language. Computer system 500 may be also implemented using specially programmed, special purpose hardware. In computer system 500, processor 502 is typically a commercially available processor such as the well-known Pentium™ or Core™ class processors available from the Intel Corporation. Many other processors are available. Such a processor usually executes an operating system which may be, for example, the Windows 7 or Windows 8 operating system available from the Microsoft Corporation, the MAC OS System X available from Apple Computer, the Solaris Operating System available from Sun Microsystems, or UNIX available from various sources. Many other operating systems may be used.

The processor and operating system together define a computer platform for which application programs in high-level programming languages are written. It should be understood that embodiments disclosed herein are not limited to a particular computer system platform, processor, operating system, or network. Also, it should be apparent to those skilled in the art that the embodiments disclosed herein are not limited to a specific programming language or computer system. Further, it should be appreciated that other appropriate programming languages and other appropriate computer systems could also be used.

One or more portions of the computer system may be distributed across one or more computer systems (not shown) coupled to a communications network. These computer systems also may be general-purpose computer systems. For example, various embodiments disclosed herein may be distributed among one or more computer systems configured to provide a service (e.g., servers) to one or more client computers, or to perform an overall task as part of a distributed system. For example, various embodiments disclosed herein may be performed on a client-server system that includes components distributed among one or more server systems that perform various functions according to various embodiments. These components may be executable, intermediate (e.g., IL) or interpreted (e.g., Java) code which communicate over a communication network (e.g., the Internet) using a communication protocol (e.g., TCP/IP). In some embodiments one or more components of the computer system 500 may communicate with one or more other components over a wireless network, including, for example, a cellular telephone network.

It should be appreciated that embodiments disclosed herein are not limited to executing on any particular system or group of systems. Also, it should be appreciated that embodiments disclosed herein are not limited to any particular distributed architecture, network, or communication protocol. Various embodiments may be programmed using an object-oriented programming language, such as Small-Talk, Java, C++, Ada, or C# (C-Sharp). Other object-oriented programming languages may also be used. Alternatively, functional, scripting, and/or logical programming languages may be used. Various embodiments disclosed herein may be implemented in a non-programmed environment (e.g., documents created in HTML, XML or other format that, when viewed in a window of a browser program, render aspects of a graphical-user interface (GUI) or perform other functions). Various embodiments disclosed herein may be implemented as programmed or non-programmed elements, or any combination thereof.

The aspects disclosed herein in accordance with the present invention, are not limited in their application to the details of construction and the arrangement of components set forth in the following description or illustrated in the accompanying drawings. These aspects are capable of assuming other embodiments and of being practiced or of being carried out in various ways. Examples of specific implementations are provided herein for illustrative purposes only and are not intended to be limiting. In particular, acts, components, elements, and features discussed in connection with any one or more embodiments are not intended to be excluded from a similar role in any other embodiments.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated reference is supplementary to that of this document; for irreconcilable inconsistencies, the term usage in this document controls.

Having thus described several aspects of at least one example, it is to be appreciated that various alterations, modifications, and improvements will readily occur to those skilled in the art. For instance, examples disclosed herein may also be used in other contexts. Such alterations, modifications, and improvements are intended to be part of this disclosure, and are intended to be within the scope of the examples discussed herein. Accordingly, the foregoing description and drawings are by way of example only.

What is claimed is:

1. A method of controlling temperature in a control zone within a building using a heating, ventilation, and air conditioning (HVAC) system that is associated with the control zone, the method comprising:

receiving measured wind condition data from at least one wind sensor positioned external to the building for at least one sample time interval at an input of a controller of the HVAC system;

receiving measured tracer gas concentration data from at least one concentration sensor positioned in the control zone for the at least one sample time interval at the controller input;

calculating a reference air flow characteristic for the at least one sample time interval using the controller based on the measured tracer gas concentration data;

generating correlated data by correlating the measured wind condition data to the reference air flow characteristic;

receiving measured wind condition data from the at least one wind sensor for an operating time interval at the controller input;

determining an operating air flow characteristic using the controller based on the measured wind condition data for the operating time interval and the correlated data;

calculating a preheat time interval for the control zone based at least in part on the operating air flow characteristic;

using at least one of the reference air flow characteristic, the operating air flow characteristic, and the preheat time interval to generate one or more control signals for use in a temperature control loop for controlling temperature in the control zone; and controlling one or more parameters of air delivered to the control zone using an actuator of the HVAC system in response to the control signals, wherein the actuator houses or is otherwise in communication with one or more components of the HVAC system for controlling the air delivered to the control zone.

2. The method of claim 1, wherein generating correlated data comprises generating a data structure that indexes the measured wind condition data with the reference air flow characteristic for the sample time interval.

3. The method of claim 1, wherein generating correlated data comprises generating a trendline that correlates the measured wind condition data with the reference air flow characteristic for the sample time interval.

4. The method of claim 1, wherein determining the operating air flow characteristic comprises comparing the measured wind condition data for the operating time interval and the measured wind condition data for the sample time interval.

5. The method of claim 1, wherein the reference air flow characteristic is air change rate (ACR).

6. The method of claim 1, wherein the at least one sample time interval occurs when the control zone is unoccupied.

7. The method of claim 6, wherein the tracer gas is carbon dioxide generated by one or more human occupants of the control zone during the interval of time when the control zone is occupied.

8. The method of claim 1, wherein controlling one or more parameters of air delivered to the control zone comprises controlling one or more of the HVAC system components for the preheat time interval.

9. A system for controlling temperature in a control zone within a building, comprising:
at least one wind sensor positioned external to the building, the at least one wind sensor configured to measure at least one wind condition;
at least one concentration sensor positioned within the control zone, the at least one concentration sensor configured to measure tracer gas concentration;
at least one temperature sensor positioned within the control zone, the at leas tone temperature sensor configured to measure temperature; and
a controller configured to:
receive data corresponding to measured wind conditions from the at least one wind sensor for at least one sample time interval;
receive data corresponding to the measured tracer gas concentration from the at least one concentration sensor for the at least one sample time interval;
calculate a reference air flow characteristic for the at least one sample time interval based on the data corresponding to the measured tracer gas concentration data;
receive data corresponding to measured wind conditions from the at least one wind sensor for an operating time interval;
determine an operating air flow characteristic based on the data corresponding to the measured wind condition data for the operating time interval and the correlated data;
calculate a preheat time interval for the temperature control loop based at least in part on the operating air flow characteristic;
generate one or more control signals for use in a temperature control loop for controlling temperature in the control zone using at least one of the reference air flow characteristic, the operating air flow characteristic, and the preheat time interval; and
control one or more parameters of air delivered to the control zone using an actuator of the system in response to the control signals, wherein the actuator houses or is otherwise in communication with one or more components of the system for controlling the air delivered to the control zone.

10. The system of claim 9, wherein the controller is further configured to generate correlated data by correlating the data corresponding to the measured wind conditions to the reference air flow characteristic.

11. The system of claim 10, wherein the controller is further configured to generate a data structure that indexes the measured wind condition data with the reference air flow characteristic for the sample time interval.

12. The system of claim 10, wherein the controller is further configured to generate a trendline that correlates the measured wind condition data with the reference air flow characteristic for the sample time interval.

13. The system of claim 9, wherein the at least one sample time interval occurs when the control zone is unoccupied.

14. The system of claim 9, wherein the system further comprises an HVAC system associated with the control zone.

15. The system of claim 9, wherein the reference air flow characteristic is air change rate (ACR).

16. The system of claim 9, wherein the controller is further configured to update the reference air flow characteristic using recursive averaging.

* * * * *